UNITED STATES PATENT OFFICE.

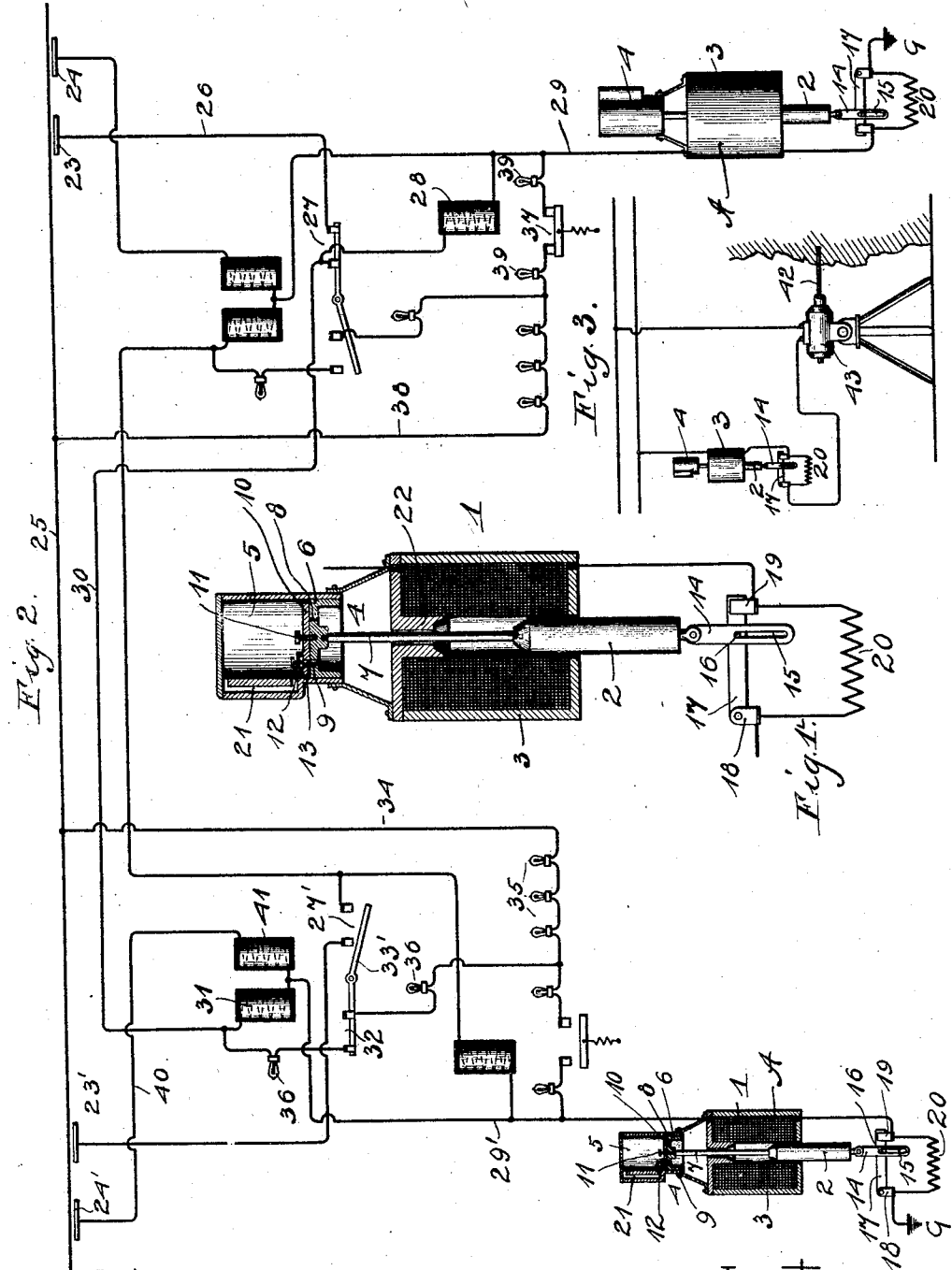

DUGALD C. JACKSON, OF MADISON, WISCONSIN.

CIRCUIT-PROTECTIVE DEVICE.

No. 835,025.  Specification of Letters Patent.  Patented Nov. 6, 1906.

Application filed September 24, 1904. Serial No. 225,740.

*To all whom it may concern:*

Be it known that I, DUGALD C. JACKSON, a citizen of the United States, residing at Madison, in the county of Dane and State of Wisconsin, have invented a certain new and useful Improvement in Circuit-Protective Devices, of which the following is a full, clear, concise, and exact description, reference being had to the accompanying drawings, forming a part of this specification.

My invention relates to circuit-protecting apparatus; and it comprises a device for inclusion in an electric circuit to be protected which will after an interval introduce a resistance in the circuit to prevent destructive current-flow, but which does not interfere with the normal performance of the functions of the apparatus in the circuit.

An occasion often arises in which it is desirable to reduce the current in a circuit after the current has been flowing for a short time, particularly in such circuits as those wherein the apparatus operated is designed to be included only momentarily, and a continued flow of current therethrough would soon cause burn-outs or other destructive results. Also when machinery driven by motors is suddenly blocked or prevented from working, so that the motor is stalled, as by an excessive load, it is sometimes desirable to maintain current flowing through the driving-motor to assist in releasing the machine. With the usual protective devices the overload would result in the motor being disconnected from the circuit by the blowing of fuses or opening of circuit-breakers. My device, on the other hand, maintains the circuit at its working efficiency, while it at the same time protects the apparatus from injury due to the abnormal currents which would flow under such circumstances if suitable protection was not afforded.

To illustrate the operation of my device, I will refer to motor-driven rock-drills. When a drill becomes jammed, it is not desirable for the motor to be cut from the circuit even though it is stalled by the overload; but it should continue to exert its torque in an effort to free the drill-point. My device included in circuit with such a machine will, upon the occurrence of an excessive current-flow, due to the motor becoming overloaded or stalled, automatically introduce a resistance into the circuit which prevents a destructive current-flow, while it maintains the torque of the motor. Many other situations may also arise where it is desirable to reduce the current in the circuit after an interval of time, and my device is suitable for such situations.

For the purpose of performing the functions aforesaid I use an electromagnet which may be in the form of a solenoid with a movable core, the solenoid-windings being included (either directly or by means of a suitable shunt) in the circuit to be controlled. The core or armature is arranged to act upon a switch, through the intervention of which resistance may be introduced into the circuit or other appropriate current-reducing means brought into play. The movement of the armature is retarded by suitable means, so that the action of the magnet is delayed and an interval of time elapses before the resistance is included in circuit. To accomplish this retardation, dash-pot mechanism may be employed in connection with the armature, and the armature may be connected with the switch through a slotted link. With this arrangement the solenoid-core rises slowly upon excessive current-flow through the circuit, and after an interval of delay the switch is actuated. It is desirable for the motion of the switch to be rapid, and this may be brought about by providing a by-pass in the dash-pot mechanism, so that at about the time the movement of the switch begins the opposition of the dash-pot is removed and the switch is quickly opened to introduce resistance into the circuit. The solenoid mechanism will remain energized sufficiently to hold the resistance in circuit until the cause producing a tendency to the flow of an excessive current has been removed; but upon the circuit again assuming its normal and safe condition the armature will be released and the switch again closed to exclude the resistance from circuit. While the resistance is in circuit, destructive current-flow through the apparatus in the circuit is prevented; but the circuit is maintained intact, and the current will be of sufficient strength to insure efficient and normal operation of the apparatus. These important features distinguish my device from other protective devices heretofore employed, which, upon excessive current-flow, are ordinarily actuated to open the working circuit or in other ways to destroy its normal efficiency, which is undesirable in the situations to which my invention particularly applies.

In my device the armature is designed to act slowly upon the overexcitation of an electromagnet, and the switch is returned quickly to its normal position upon cessation of such excessive current-flow, and the activity of the circuit is maintained by my device.

My invention will be more readily understood by reference to the accompanying drawings, in which—

Figure 1 is a longitudinal vertical sectional view of a form of my device, showing its construction. Fig. 2 shows an application thereof for protecting apparatus included in a signaling system, and Fig. 3 shows another application thereof for protecting a motor.

Like reference characters refer to like parts throughout the various figures.

A solenoid-winding 1 is adapted to receive a core 2, a magnetic shroud 3 inclosing the winding and offering a magnetic path for the lines of force created by the winding. This is a desirable form for the electromagnet; but its particular form is not essential to the invention. Dash-pot mechanism 4 may be mounted at the top of the solenoid-casing and consists of a dash-pot cylinder 5, in which the plunger 6 is adapted to reciprocate, the plunger being connected with the upper end of the solenoid-core by means of a rod 7. Openings 8 and 9 through the piston 6 are covered by a disk-valve 10, which is loosely held in position by a headed pin 11. An adjustable valve 12 is mounted over an opening 13 in the disk-valve registering with the opening 9 through the piston, and by adjusting the size of the opening 13 the amount of retardation upon upward stroke of the piston may be adjusted. Upon downward stroke of the piston the disk-valve is released from the openings through the piston, allowing free passage of air therethrough and quick return of the piston. A link 14 connects with the lower end of the solenoid-core, and at its other end is provided with a slot 15, engaging a pin 16, secured near one end of the switch-blade 17, which switch-blade when closed serves to connect circuit-terminals 18 and 19, between which resistance 20 is bridged. The solenoid-winding 1 is preferably connected serially in the circuit to be protected, while the switch-blade and resistance are normally connected in multiple series therein. Upon sufficient current-flow through the solenoid-winding the core 2 will be attracted upwardly, and the switch-blade 17 will not move until the lower end of the slot 15 engages the pin 16. Owing to the dash-pot connection with the core 2, this upward motion will be retarded, and about the time that the pin 16 engages the lower end of the slot 15 means are provided for removing the retardation and allowing the attraction of the core to cause the switch to be quickly withdrawn from the terminal 19. This means may consist in a by-pass 21, so adjusted as to allow immediate escape of the air above the piston in the dash-pot when the pin 16 is reached by the end of the slot 15. Upon the opening of the switch the resistance 20 is included in the circuit and the excessive current reduced to a safe value. The core when in its upper position may come into contact or nearly into contact with an iron cap or fixed portion of core 22, which covers the upper part of the shroud 3 and extends a distance into the solenoid-core opening.

On account of the introduction of the resistance 20 into the circuit reduced current flow will necessarily result through the winding 1; but by means of the increased strength of attraction, due to the cap 22, the current strength through the solenoid-winding, although decreased, will still be sufficient to maintain the attraction of the core, and consequently to maintain the resistance in circuit during the time that an excessive current tends to flow through the main circuit. Upon the current approaching its normal flow, however, the strength of attraction of the solenoid will be reduced and the core released, and, due to the weight of the core, which is not impeded by the dash-pot upon downward travel, the switch will be quickly closed and the resistance cut from circuit. The magnet-winding is in the main circuit, and is therefore energized whenever current flows therethrough; but the core is adjusted by means of its weight or the effect of a spring, so that it is not lifted until the current becomes abnormal.

In Fig. 2 I have illustrated my invention applied to an arrangement of block-signals which has been used in connection with electric railways for the purpose of indicating to the crew of a car at a siding whether or not a car already occupies the single track which leads to the next siding ahead. At each siding or turnout in the single track contact-strips 23 24 and 23′ 24′, respectively, are provided, these contact-strips being associated with the trolley-wire 25. Upon the passage of a trolley-wheel under a contact-strip the strip is briefly connected with the trolley-wire. A car passing under the contact-strip 23 causes momentary connection therewith with the trolley-wire 25, and current momentarily flows from the trolley-wire through the conductor 26, switch 27, and divides, part flowing through the electromagnet 28 through the conductor 29 to ground, the remainder flowing through the conductor 30, electromagnet 31 at the succeeding siding, and through conductor 29′ to ground. The switch 32 will thus be closed upon attraction of the pivoted switch-lever 33′ by the magnet 31, and a circuit will be closed from the trolley-wire 25, through conductor 34, through lamps or resistance 35, through the signal-lamps 36 36, the current here dividing, part passing through electromagnet 31 and through conductor 29' to ground, the remaining current passing through conductor 30 and through electromagnet 28 to ground. Electromagnet 28 upon energization attracts the armature 37 to close a switch 37 between conductor 38 and signal-lamps 39 39 to ground. Any other car now approaching either siding will see the burning lights 36 36 or 39 39 and will know that a car occupies the track. When the car has traversed the track from contact-strip 23 to contact-strip 24', thus traversing the block, its trolley touches the contact-strip 24' and a momentary current-flow is established through the conductor 40 and through the electromagnet 41 to ground through conductor 29'. The switch-arm 33' is now attracted by magnet 41 to close the switch 27' and to open the switch 32. Opening the switch 32, however, breaks the circuit through the signal-lamps 36 and through the electromagnet 28, thus extinguishing the signal-lamps and indicating to the cars approaching the single track that the track is clear in the block. A car passing on the single track in the reverse direction sets and clears the signals by the contact-strips 23' and 24. The electromagnets for controlling the switches in a circuit of this kind are usually intended for only momentary energization, and continued current-flow therethrough is likely to injure them. It sometimes happens that a car comes to a standstill in such a position that the trolley-wheel maintains connection between the trolley-wire and one of the contact-strips, and this of course causes a continued current-flow through the electromagnets. My invention serves to prevent injury to the electromagnets under such conditions, while maintaining the circuits intact and in working condition. A circuit-protector A is introduced into each ground-conductor 29 and 29', for instance, or in any other appropriate part of the circuit. Upon continued current-flow with the protecting device in circuit the cores thereof will be gradually attracted, and if the current-flow be continued long enough the cores will eventually open the respective switches 17 17, controlled thereby, and thus introduce a resistance in circuit which prevents the current-flow from becoming of injurious strength, and thus prevents injury to the electromagnets.

In Fig. 3 I have shown another application of the controlling apparatus. I have shown a rock-drill 42 operated by an electric motor 43, and in the circuit for this motor I include the protecting device. Drills of this kind very often become jammed in rock, for instance, and it is desirable that the motor torque be maintained on the drill to assist in its release. The motor, however, being unable to rotate, is traversed by an excessive current flowing through its windings unless protective means are provided. In the application of my invention the solenoid of the protecting device is included in the circuit, and if the motor becomes stalled or an excessive current flows for any cause the resistance 20 is introduced in circuit and the current through the motor is limited to a safe value. At the same time the circuit is maintained intact and the motor continues to exert its torque on the drill. Upon the release of the drill the current may assume its normal flow, and the solenoid will release its armature and the resistance is again shunted from the circuit.

My invention is thus a distinct improvement over protective devices heretofore used. It does not open or in any way destroy the effectiveness or efficiency of the working circuit; but it serves to prevent the operative devices from becoming injured from excessive current, while these devices are at the same time maintained in their operative condition. My invention also continues to act in protecting the circuit until the cause of the excessive current is withdrawn, and if the current again falls to its normal value the circuit is restored to its original condition, while the protective device remains ready to perform its protective functions over again when conditions require it.

The signal-circuits and motor-circuits in connection with which my invention is here described are only examples of numerous instances in which it can be successfully and advantageously employed, and I do not wish to be limited to these described applications, since the adaptation of my invention to other appropriate situations will now be understood.

I claim as new and desire to secure by Letters Patent—

1. The combination with a circuit containing translating devices, of a resistance in said circuit normally short-circuited by a switch-blade, a solenoid-winding included in said circuit, an armature adapted to be attracted within said winding upon energization thereof, a slotted link connecting said armature with said switch-blade for preventing movement of said switch-blade during an interval of movement of the core upon attraction thereon, and means for retarding the movement of said core during said interval, said slotted link after said interval causing said switch-blade to be engaged to be moved upon further attraction of said core to open the short circuit about said resistance, said resistance being effectively included in circuit without interfering with the normal operation of the translating devices in said circuit.

2. The combination with a circuit containing translating devices, of a resistance in said circuit normally short-circuited by a switch-blade, a solenoid-winding included serially in said circuit, an armature-core adapted to be attracted within said winding upon energization thereof, a slotted link connecting said armature with said switch-blade for preventing actuation of said switch-blade during an interval, said slotted link after said interval allowing said switch-blade to be moved by said attracted core to open the short circuit about said resistance, said resistance being thereupon included serially in said circuit.

3. The combination with a circuit including translating devices, of a resistance in said circuit normally short-circuited by a switch-blade, a solenoid-winding included serially in said circuit, an armature-core adapted to be attracted within said winding upon energization thereof, a slotted link connecting said armature-core with said switch-blade to prevent actuation of said switch-blade for a certain distance of attraction of said core within said winding, means for retarding the motion of said core during said distance, said link upon further attraction beyond said distance causing said switch-blade to be moved to open said short circuit about said resistance, and means for removing the retarding influence after a predetermined interval whereby said switch-blade is quickly actuated.

4. The combination with a circuit containing translating devices, of a resistance in said circuit normally short-circuited by switch-blade, a solenoid-winding included in said circuit, an armature-core adapted to be attracted within said winding upon energization thereof, said armature being connected with said switch-blade by means of a slotted link so arranged that the switch-blade will not be effectively engaged until the armature-core has almost completed its movement, means for retarding the motion of said armature during said movement thereof, and means for releasing the retarding means from the armature near the end of its movement to allow the armature to quickly finish its movement and to quickly move the switch-blade to remove its short-circuiting effect from the resistance.

5. The combination with a circuit containing translating devices, of a resistance in said circuit normally short-circuited by a switch-blade, a solenoid-winding included in said circuit, an armature-core adapted to be attracted within said winding upon energization thereof, a connecting-link connecting said armature with the switch-blade, means for causing relative movement between the connecting-link and switch-blade during movement of the armature to almost finish its stroke, dash-pot mechanism connected with the armature and adjusted to retard its movement during relative movement between the connecting-link and the switch-blade, and means for destroying the retarding effect of the dash-pot mechanism during the end of the stroke of the armature to allow quick movement of the armature and quick movement of the switch-blade to remove its short-circuiting effect from the resistance.

6. The combination with a circuit including translating devices, of a resistance in said circuit, short-circuiting means for normally rendering said resistance ineffective, a solenoid-winding included in said circuit, an armature-core adapted to be attracted within said winding on excess current-flow through the circuit, connecting means between the armature-core and the short-circuiting means, said connecting means being ineffective during the beginning of the armature movement, dash-pot mechanism for retarding the initial movement of the armature-core and means for destroying the retarding effect of the dash-pot mechanism near the end of the armature movement to allow said armature to quickly finish its movement, and means for causing the connecting means to become effective during this quick movement period of the armature-core whereby the short-circuiting means is quickly actuated to allow the resistance to become effective.

In witness whereof I hereunto subscribe my name this 20th day of September, A. D. 1904.

DUGALD C. JACKSON.

Witnesses:
CHARLES J. SCHMIDT,
LEONARD W. NOVANDER.